(No Model.)

J. F. KELLY.
ALTERNATING CURRENT MOTOR.

No. 522,344. Patented July 3, 1894.

WITNESSES:
Frank S. Ober.
C. R. Lohse

INVENTOR
John F. Kelly
BY
H. B. Brownell
ATTORNEY

UNITED STATES PATENT OFFICE.

JOHN F. KELLY, OF PITTSFIELD, MASSACHUSETTS, ASSIGNOR TO THE STANLEY LABORATORY COMPANY, OF SAME PLACE.

ALTERNATING-CURRENT MOTOR.

SPECIFICATION forming part of Letters Patent No. 522,344, dated July 3, 1894.

Application filed February 26, 1894. Serial No. 501,465. (No model.)

*To all whom it may concern:*

Be it known that I, JOHN F. KELLY, of the city of Pittsfield, county of Berkshire, and State of Massachusetts, have invented a certain new and useful Alternating-Current Motor, of which the following is a specification.

My invention is an alternating current motor and has for its object to produce a means for practically transforming the electrical energy of a single alternating current into mechanical energy in the form of continuous rotary motion without the use of commutators or similar devices, and without the use of any modifier of the magnetic or electrical phases of the magnetic field or the exciting current or of any auxiliary circuit or starting device. This I believe has never, before my invention, been accomplished by any known means. I attain this object by the mechanism illustrated in the accompanying drawings, in which—

Figure 1:
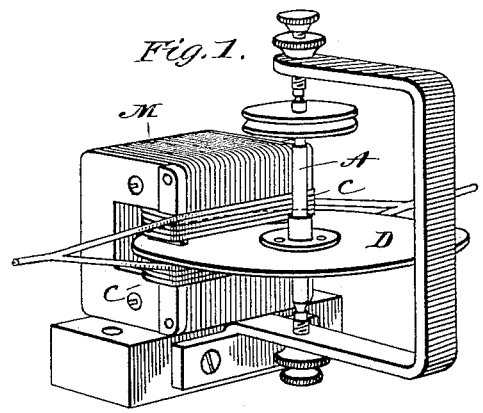
Figure 2:
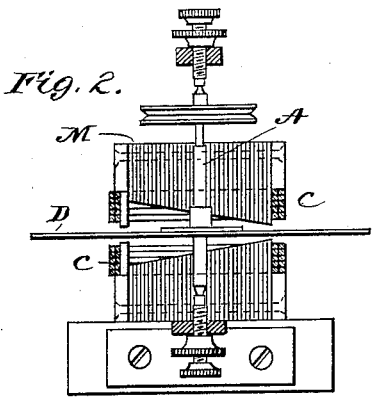
Figure 3:
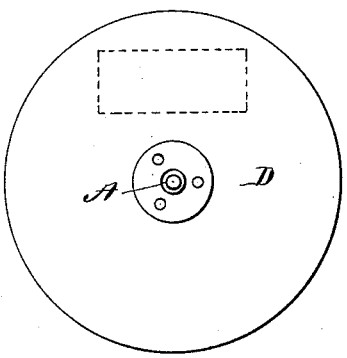
Figure 4:
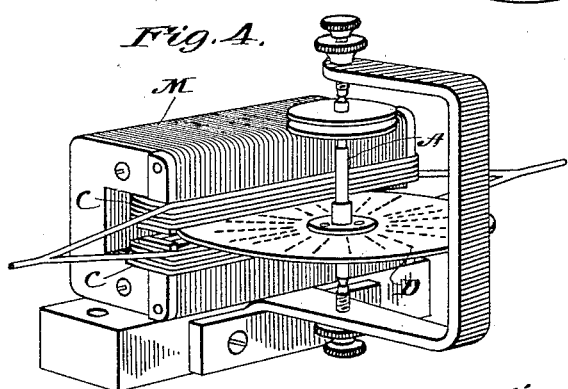
Figure 5:
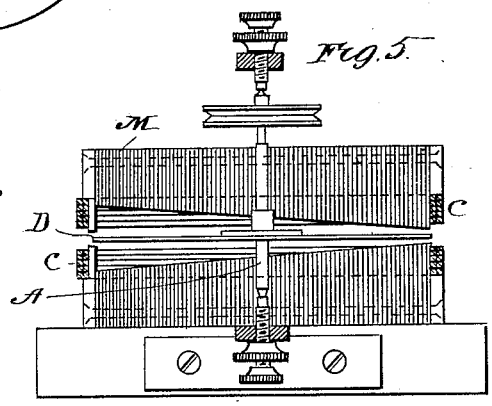
Figure 6:
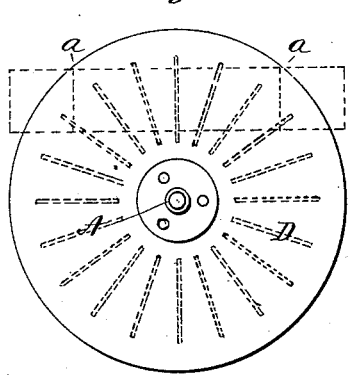

Figure 1 is a perspective view of the motor. Fig. 2 is a front view with the coils cut away so as to show the poles of the field magnet. Fig. 3 is a view showing a projection of the pole upon the disk, and Figs. 4, 5 and 6 are similar views of another construction.

In the drawings M represents a laminated field magnet the north and south pole pieces of which are brought face to face and cut away so as to leave a wedge shaped space between them; C an exciting coil in circuit with a source of alternating current; D a disk of homogeneous copper or other good electrical conductor supported by a suitably mounted axis A so as to lie between the pole pieces and be free to rotate in a direction from either end of the wedge shaped air space toward the other.

Upon the passage of an alternating current through the exciting coil C, the field magnet becomes energized and an alternating magnetic field of single or uniform phase produced lying between the pole pieces, the magnetic flux being from one pole to the other. By reason of the wedge shaped air space the reluctance of the magnetic circuit is asymmetrical, by which I mean that the distribution of the reluctance is not the same on both sides of the center of the figure of the pole, and, consequently, the magnetic flux is greater toward the narrower part of the air space, that is, the alternating magnetic field is more strong or dense in that part, or, as we may say, a magnet so constructed produces, when energized, by an alternating current, an asymmetrical alternating magnetic field, of single or uniform phase by which I wish to be understood as meaning an alternating magnetic field in which the distribution of the flux is not the same on both sides of the center of its figure; the flux, therefore, is also asymmetrical with reference to the figure of the field. Currents are induced in the disk lying within the field.

In Figs. 1, 2 and 3, I have shown a construction in which the disk extends far enough beyond the strongest side of the pole to permit the induced currents to flow there. In such a construction when the asymmetrical alternating magnetic field is set up the reaction of the currents induced in the copper disk is such as to cause the disk to rotate in a direction from the widest and toward the narrowest part of the air space.

In Figs. 4, 5 and 6 is shown a construction in which the strong side of the field magnet extends beyond the copper disk. In such a case, when the asymmetrical alternating magnetic field is set up the reaction of the currents induced in the disk is such as to produce a movement of rotation in the disk from the narrowest and toward the widest part of the air space. I have indicated in dotted lines in these Figs. 4, 5 and 6 radial slots which may be made in the induced disk. These slots so direct the induced current as to increase the tendency to turn in the direction of the widest part of the air-gap, and when used permit a narrowing of the pole pieces, as shown at *a* Fig. 6, so that they need not extend clear to the edge if only they extend so that the greater portion of the current will be directed beneath the poles, *i. e.*, so that both limbs of the current will pass beneath the poles and directly through the field instead of going outside the poles to do which it would have to travel in a much longer path by reason of the radial slots. The slots practically amount to a reduction in the size of the disk, and I have found that a disk slotted nearly or quite to the edge will rotate toward the wider part of the air space, whatever may be the size of the pole relatively to the disk, if only the segments are of such size that the driving torque of those lying beneath the poles is sufficient to overcome the driving torque of the segment just entering the strongest part of the field.

Whether the disk is slotted or not, it is practically symmetrical with its axis and by reason of its symmetry whenever one portion moves from one side of the magnetic field, another and substantially similar portion enters the other side, so that there is continually present and under the influence of the inducing system, a conductor of substantially unchanging form.

I do not desire to limit myself to a motor in which the particular form of symmetrical induced conducting system above described is used, or in which the asymmetrical inducing field is produced by the particular means mentioned.

In this application, I do not claim the method of converting electrical energy into mechanical energy which is carried out by the motor herein described, being about to make separate application for a patent on such method; but What I do claim herein as my invention, and desire to secure by Letters Patent, is—

1. An alternating current motor consisting of an inducing system having, when energized by an alternating current, an asymmetrical single phase alternating magnetic field in combination with a closed symmetrical induced system, the two systems being relatively movable, substantially as described.

2. In an alternating current motor, a field magnet from the pole pieces of which the magnetic flux is asymmetrical and of uniform phase and whose energizing coils are connected with a source of alternating current, in combination with a conducting closed system symmetrical about an axis around which one of the members of the motor is free to rotate, substantially as described.

3. An alternating current motor consisting of a field magnet whose energizing coils are in circuit with a source of alternating current and from whose pole pieces the magnetic flux is asymmetrical and of uniform phase in combination with a rotary closed conducting system symmetrical about an axis on which it is free to rotate, substantially as described.

4. An alternating current motor consisting of a field magnet, the reluctance of which is asymmetrical to the faces of its poles, and the field of which when energized by an alternating current is of single or uniform phase in combination with a closed conducting system symmetrical with reference to an axis about which one of the elements is free to rotate, substantially as described.

5. An alternating current motor consisting of the combination of a field magnet having, when energized by an alternating current an asymmetrical alternating field of single or uniform phase in combination with a disk of suitable conducting material lying partly within said field and mounted symmetrically about an axis so as to be free to rotate, substantially as described.

JOHN F. KELLY.

Witnesses:
   Jno. H. Noble,
   C. C. Chesney.